Patented Apr. 12, 1932

1,853,415

UNITED STATES PATENT OFFICE

FRITZ GÜNTHER, CURT SCHUSTER, AND JOSEF HETZER, OF LUDWIGSHAFEN-ON-THE-RHINE, GERMANY, ASSIGNORS TO I. G. FARBENINDUSTRIE AKTIENGESELLSCHAFT, OF FRANKFURT-ON-THE-MAIN, GERMANY, A CORPORATION OF GERMANY

WETTING, CLEANING AND EMULSIFYING AGENTS

No Drawing. Original application filed May 17, 1926, Serial No. 109,806, and in Germany May 22, 1925. Divided and this application filed September 24, 1928. Serial No. 308,134.

The present application has been divided out from our copending application No. 109,806 filed May 17, 1926.

It is known that sulfonic acids of alkylated hydrocarbons possess a high wetting power. It has also been suggested to employ synthetic tans containing sulfonic acid groups as cleaning agents.

We have now found that aromatic sulfonic acids which are not suitable for use as tanning materials (which property is ascertained by the incapability of the sulfonic acids of precipitating glue from its aqueous solutions) and which are substituted in the nucleus by at least one halogen atom or nitro hydroxyl or amino group, all of which may be designated as "active substituents", or by several such substituents and which also contain, whether in the nucleus or in the substituent, or in both, one or several alkyl groups, possess a high wetting power and are valuable substitutes for soaps and the like. Further they are excellently suitable for emulsifying organic liquids in water and for dispersing dyestuffs or other solid materials. The said sulfonic acids may be employed in the state of free acids or as salts which are equivalents for the purposes of the present invention. They offer the great advantage of giving stable dispersions also in acid solution and in the presence of calcium or other salts forming insoluble precipitates with ordinary soaps.

As examples of suitable sulfonic acids of the aforesaid type, we mention di-ethyl-metanilic acid, di-butyl-aniline sulfonic acids, N-di-amyl-alpha-naphthylamine sulfonic acid, isopropyl-chlor-naphthalene sulfonic acid, iso-propyl-naphthol sulfonic acids and the like or salts of such acids.

The following examples will further illustrate how our invention may be carried out in practice, but the invention is not limited to these examples. The parts are by weight.

Example 1

100 parts of a 10 per cent aqueous paste of indanthrene blue RS are intimately mixed with an aqueous solution of 1 part of di-ethyl-metanilic acid sodium salt and dried. A readily wettable powder which is finely dispersed when mixed with water, is obtained. Other dyestuffs can be treated in a similar manner, whether with the said sulfonic acid or for example with the di-amyl-alpha-naphthylamine sulfonic acid sodium salt.

Example 2

200 parts of di-butyl-aniline sulfonic acid sodium salt are dissolved in 1000 parts of water. The solution is mixed with 400 parts of methyl cyclo-hexanone. A clear solution is obtained which can be strongly diluted with water without becoming dull by a separation of methyl cyclo-hexanone and which is very suitable for use as a cleaning or washing agent.

When employing less di-butyl-aniline sodium sulfonate, methyl cyclo-hexanone or another difficultly soluble organic liquid is emulsified in an excellent manner, but no clear solution is obtained.

We do not lay claim, in this application, to the benzyl-aniline or ethyl-benzyl-aniline sulfonic acids since they are not efficient for the purpose of the present invention.

What we claim is:

1. The process of preparing aqueous emulsions of organic liquids difficultly soluble in water characterized by an addition of di-amyl-alpha-naphthylamine sulfonic acid sodium salt.

2. The process of producing stable dispersions of materials in water which comprises treating the materials with an aromatic sulfonic acid which is incapable of precipitating glue from its aqueous solution, contains at least one alkyl group and at least one active substituent, selected from the group consisting of amino and hydroxyl groups, and has a higher wetting power than benzyl-aniline and ethyl-benzyl-aniline sulfonic acids.

3. The process of preparing aqueous emulsions of organic liquids difficultly soluble in water characterized by an addition of an aromatic sulfonic acid, which is incapable of precipitating glue from its aqueous solution, contains at least one alkyl group and at least one active substituent selected from the group consisting of amino and hydroxyl groups and has a higher wetting power than benzyl-aniline and ethyl-benzyl-aniline sulfonic acids.

4. The process of preparing aqueous emulsions of organic liquids difficultly soluble in water characterized by an addition of a sulfonic acid, derived from an aromatic polynuclear hydrocarbon, which is incapable of precipitating glue from its aqueous solution, contains at least one alkyl group and at least one active substituent, selected from the group consisting of amino and hydroxyl groups, and has a higher wetting power than benzyl-aniline and ethyl-benzyl-aniline sulfonic acids.

5. As a composition of matter an aqueous suspension of a material insoluble in water comprising an aromatic sulfonic acid which is incapable of precipitating glue from its aqueous solution, contains at least one alkyl group and at least one active substituent, selected from the group consisting of amino and hydroxyl groups, and has a higher wetting power than benzyl-aniline and ethyl-benzyl-aniline sulfonic acids.

6. As a composition of matter an aqueous suspension of a colouring material insoluble in water comprising an aromatic sulfonic acid, which is incapable of precipitating glue from its aqueous solution, contains at least one alkyl group and at least one active substituent, selected from the group consisting of amino and hydroxyl groups, and has a higher wetting power than benzyl-aniline and ethyl-benzyl-aniline sulfonic acids, a finely divided water-insoluble colouring matter and water.

7. The process of preparing stable aqueous dispersions of materials which are but slightly soluble in water, which comprises incorporating said materials in water, together with a water-soluble sulphonic acid compound of a hydrocarbon containing condensed benzene nuclei, an alkyl group, and an active substituent selected from the class consisting of halogen atoms, amino and hydroxyl groups.

8. The process of preparing stable aqueous dispersions of materials which are but slightly soluble in water, which comprises incorporating said materials in water, together with a water-soluble sulphonic acid compound of a naphthalene hydrocarbon containing an alkyl group and an active substituent selected from the class consisting of halogen atoms, amino and hydroxyl groups.

9. The process of preparing stable aqueous emulsions of materials which are but slightly soluble in water, which comprises incorporating said materials in water, together with a water-soluble sulphonic acid compound of a naphthalene hydrocarbon containing condensed benzene nuclei, an alkyl group and an amino group.

10. As a composition of matter an aqueous suspension of a material insoluble in water, comprising di-amyl-alpha-naphthylamine sulphonic acid sodium salt.

In testimony whereof, we affix our signatures.

FRITZ GÜNTHER.
CURT SCHUSTER.
JOSEF HETZER.